United States Patent
Depaolo et al.

(10) Patent No.: US 10,977,354 B1
(45) Date of Patent: *Apr. 13, 2021

(54) AUTHENTICATION DEVICE FOR VIRTUAL ASSISTANT SYSTEMS

(71) Applicant: MASSACHUSETTS MUTUAL LIFE INSURANCE COMPANY, Springfield, MA (US)

(72) Inventors: Damon Ryan Depaolo, Barkhamsted, CT (US); Laura Barcome, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 226 days.

This patent is subject to a terminal disclaimer.

(21) Appl. No.: 16/170,999

(22) Filed: Oct. 25, 2018

(51) Int. Cl.
*G06F 21/32* (2013.01)
*H04L 29/06* (2006.01)
*G06F 21/34* (2013.01)
*H05K 5/02* (2006.01)
*H02J 7/00* (2006.01)
*G06K 9/00* (2006.01)
*G06F 21/45* (2013.01)
*G06F 3/16* (2006.01)
*H01R 31/06* (2006.01)

(52) U.S. Cl.
CPC ............ *G06F 21/32* (2013.01); *G06F 21/34* (2013.01); *G06F 21/45* (2013.01); *G06K 9/00087* (2013.01); *H02J 7/0042* (2013.01); *H04L 63/0861* (2013.01); *H04L 63/0884* (2013.01); *H05K 5/0217* (2013.01); *G06F 3/16* (2013.01); *H01R 31/06* (2013.01)

(58) Field of Classification Search
CPC .......... G06F 21/32; G06F 21/34; G06F 21/45; G06F 3/16; G06K 9/00087; H02J 7/0042; H04L 63/0861; H04L 63/0884; H05K 5/0217; H01R 31/06
See application file for complete search history.

(56) References Cited

U.S. PATENT DOCUMENTS

| | | | | |
|---|---|---|---|---|
| 5,229,764 | A * | 7/1993 | Matchett | H04W 12/1206 340/5.52 |
| 6,886,104 | B1 * | 4/2005 | McClurg | G06K 9/00013 320/156 |
| 8,915,361 | B2 * | 12/2014 | Rayner | G06F 1/1601 206/320 |
| 10,225,734 | B1 * | 3/2019 | Shipman | H04W 12/06 |
| 10,848,392 | B2 * | 11/2020 | Kapinos | H04L 63/083 |
| 2007/0154074 | A1 * | 7/2007 | Schneider | G06K 9/00006 382/126 |
| 2009/0158423 | A1 * | 6/2009 | Orlassino | G06F 21/32 726/19 |
| 2010/0042671 | A1 * | 2/2010 | Natt | H04M 1/06 709/203 |
| 2012/0303476 | A1 * | 11/2012 | Krzyzanowski | G06F 8/60 705/26.5 |
| 2019/0253324 | A1 * | 8/2019 | Kapinos | G06F 3/167 |

* cited by examiner

*Primary Examiner* — J. Brant Murphy
(74) *Attorney, Agent, or Firm* — Foley & Lardner LLP

(57) ABSTRACT

Disclosed herein is a virtual assistant system having a biometric authentication device coupled to an electronic voice-based virtual assistant device. The biometric authentication device is configured to authenticate a user based on biometric data of the user to allow the user access to features of the electronic voice-based virtual assistant device.

16 Claims, 9 Drawing Sheets

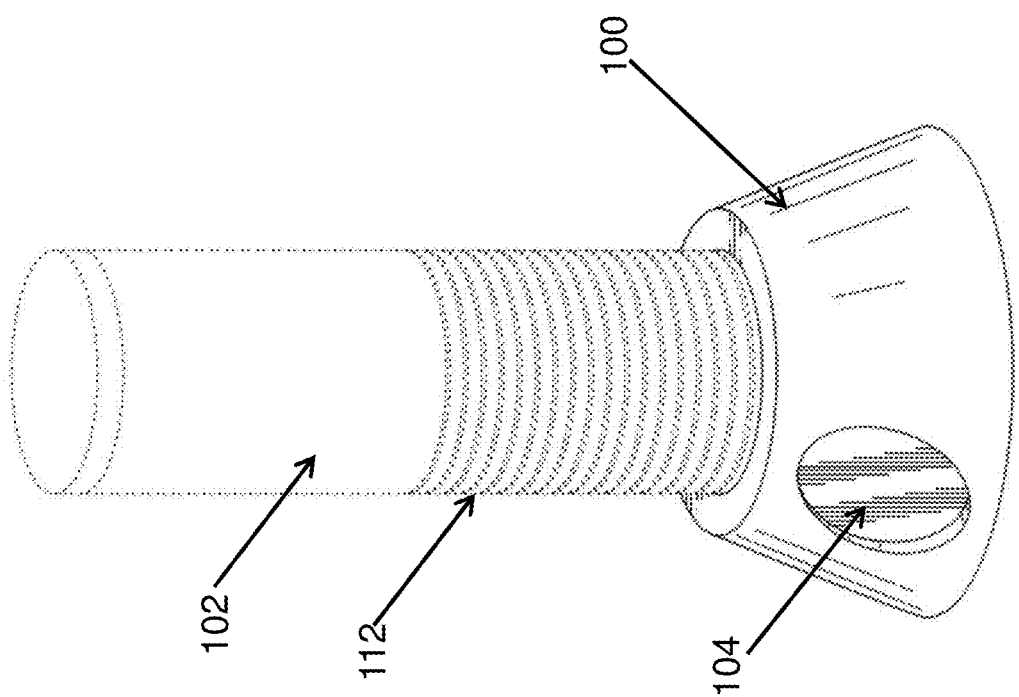

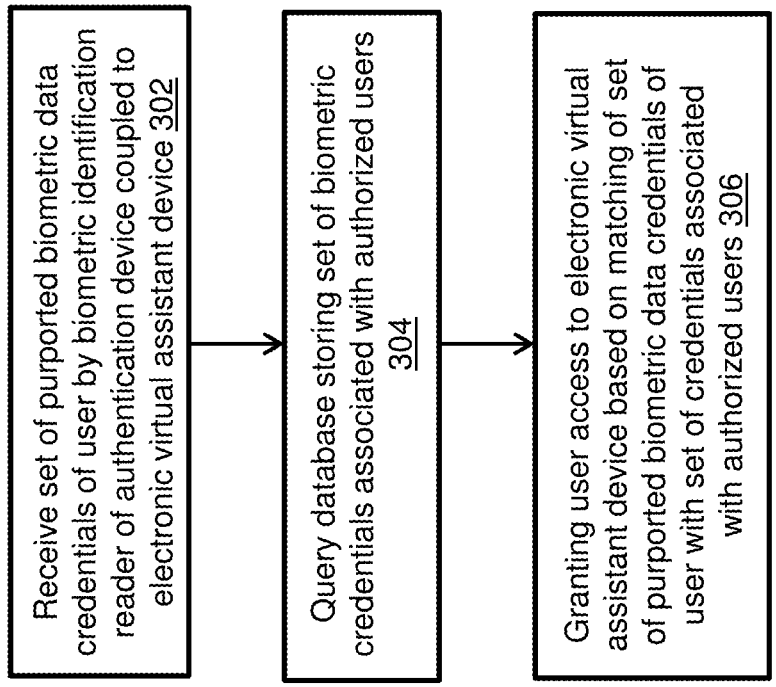

AUTHENTICATION DEVICE FOR VIRTUAL ASSISTANT SYSTEMS

TECHNICAL FIELD

This application relates generally to the field of virtual assistant systems, and more particularly to the field of authentication devices allowing secure access to the virtual assistant systems.

BACKGROUND

Intelligent automated assistants such as virtual assistants is a growing field of artificial intelligence technology that provide beneficial interfaces between human users and electronic devices. The virtual assistants allow users to interact with devices or systems using natural language in spoken and/or text forms. A user can provide a spoken input containing a user request to a virtual assistant operating on an electronic device. The virtual assistant interprets the user's intent from the spoken input and operationalizes the user's intent into one or more tasks. The tasks can then be performed by executing one or more services of the electronic device, thereby returning relevant output responsive to the user request. The tasks and responsibilities can include monitoring calendar tasks, extracting relevant news, making travel reservations, or performing financial transactions.

As the prevalence of virtual assistants grows, authentication of users and system security on the virtual assistants continues to be an important concern. If a non-authorized person obtains access to a virtual assistant of a user, then the non-authorized person may be able to obtain sensitive information and privileges associated with the user. After gaining the sensitive information and the privileges of the user, a non-authorized person may attempt to commit fraudulent transactions using the sensitive information, change the settings on the virtual assistant, or access network resources. Therefore, there is a need for authentication systems for the users of the virtual assistants in order to enhance the security of the virtual assistants.

SUMMARY

Disclosed herein are systems and methods capable of addressing the above-described shortcomings by preventing unauthorized users access to stand-alone and stationary virtual assistants, and may also provide any number of additional or alternative benefits and advantages. For example, various embodiments described herein generally relate to methods and systems that provide an efficient and secure technique for authentication of a user by multi factor authentication techniques before allowing the user to execute a command using a stand-alone and stationary virtual assistant device. A stand-alone and stationary virtual assistant device such as AMAZON™ ALEXA™ may provide a communication interface to users allowing the users to interact with a virtual assistant program of the stand-alone and stationary virtual assistant device using natural language in spoken and/or text forms. Prior to any interaction with the virtual assistant program, the user may be required to provide biometric input data to an authentication device coupled with the stand-alone and stationary virtual assistant device, which may be used by the authentication device to authenticate identity of the user, and enabling interaction between the user and the virtual assistant program of the stand-alone and stationary virtual assistant device only upon successful authentication of the user.

In one embodiment, an authentication device may include a housing, a recess, and a fingerprint reader. The housing may include an outer surface and an inner surface. The housing may further include a top wall, a bottom wall positioned opposite to the top wall, and at least one lateral wall joined to and disposed between the top wall and the bottom wall. The recess within the housing may open towards the top wall and spaced inwardly of the inner surface of the housing. The recess is configured to receive an electronic virtual assistant device. The fingerprint reader is disposed on the outer surface of the housing and is configured to receive a set of purported fingerprint data credentials of a user for authenticating the user.

In another embodiment, an authentication device may include a housing, a recess, a fingerprint reader, and a power charging adapter. The housing may include an outer surface and an inner surface. The housing may further include a top wall, a bottom wall positioned opposite to the top wall, and at least one lateral wall joined to and disposed between the top wall and the bottom wall. The recess within the housing may open towards the top wall and spaced inwardly of the inner surface of the housing. The recess is configured to receive an electronic virtual assistant device. The fingerprint reader is disposed on the outer surface of the housing and is configured to receive a set of purported fingerprint data credentials of a user for authenticating the user. The power charging adapter is disposed within the housing. The power charging adapter may include a charging body coupled to a power connector having an elongated shape. The power connector is configured to receive a corresponding socket of the electronic virtual assistant device and the charging body comprising a charging contact enabling passing through of power charge.

In another embodiment, a virtual assistant system may include an authentication database configured to store a set of biometric credentials associated with authorized users. The virtual assistant system may further include an authentication device comprising a first housing comprising an outer surface and an inner surface and a biometric identification reader disposed on the outer surface of the first housing. The biometric identification reader is configured to receive a set of purported biometric data credentials of a user. The virtual assistant system may further include an authentication server in communication with the authentication database and the biometric identification reader via a network, the authentication server receiving an authentication request associated with the user comprising the set of purported biometric data credentials of the user from the biometric identification reader and processing the authentication request to determine an authentication status of the user. The virtual assistant system may further include a stand-alone and stationary electronic virtual assistant device comprising a second housing, wherein one or more components associated with the second housing are coupled to corresponding one or more components associated with the first housing to securely pair the stand-alone and stationary electronic virtual assistant device with the authentication device, the stand-alone and stationary electronic virtual assistant device is configured to receive the authentication status of the user from the authentication server upon the authentication server completing the processing of the authentication request.

In another embodiment, a method may include receiving, by an authentication server, via a biometric identification reader of an authentication device disposed on an outer surface of the authentication device, an authentication request associated with a user comprising a set of purported biometric data credentials of a user to execute a command using a stand-alone and stationary electronic virtual assistant device, wherein one or more components of the authentication device are coupled to one or more components of stand-alone and stationary electronic virtual assistant device, and wherein the authentication server is in communication with the authentication device and the stand-alone and stationary electronic virtual assistant device via a network. The method may further include, in response to receiving the authentication request, querying, by the authentication server, a database configured to store a set of biometric credentials associated with authorized users permitted to execute the command using the stand-alone and stationary electronic virtual assistant device. The method may further include, in response to the authentication server matching the set of purported biometric data credentials of the user with the set of credentials associated with authorized users, granting, by the server to the user, access to execute the command using a virtual assistant program being executed on the stand-alone and stationary electronic virtual assistant device.

In another embodiment, a virtual assistant system may include a database, an authentication device, and an electronic virtual assistant device. The authentication device may include a first housing and a biometric identification reader disposed on an outer surface of the first housing and configured to receive a set of purported biometric data credentials of a user for authenticating the user. The electronic virtual assistant device may include a second housing, wherein the second housing is coupled to the first housing of the authentication device for securely pairing the electronic virtual assistant device with the authentication device, and wherein the electronic virtual assistant device is configured to receive authentication status of the user from the authentication device.

In another embodiment, a virtual assistant system may include a database, an authentication device, and an electronic virtual assistant device. The authentication device may include a first housing, a biometric identification reader disposed on an outer surface of the first housing and configured to receive a set of purported biometric data credentials of a user, and a processor configured to authenticate the user upon determining that the set of purported biometric data credentials received from the user in the biometric identification reader matches a set of credentials associated with authorized users stored in the database. The electronic virtual assistant device may include a second housing, wherein the second housing is coupled to the first housing of the authentication device for securely pairing the electronic virtual assistant device with the authentication device, and wherein the electronic virtual assistant device is configured to process one or more requests from the user upon receiving confirmation of authentication of the user from the authentication device.

In another embodiment, a method may include receiving, by an authentication server, via a biometric identification reader of an authentication device, an authentication request for a user to execute a command using an electronic virtual assistant device, the authentication request comprising a set of purported biometric data credentials of a user. The method may further include querying, by the authentication server, a database configured to store a set of biometric credentials associated with authorized users. The method may further include, in response to the authentication server matching the set of purported biometric data credentials of the user with the set of credentials associated with authorized users, granting, by the server to the user, access to a virtual assistant program being executed on the electronic virtual assistant device.

It is to be understood that both the foregoing general description and the following detailed description are explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

FIG. 1J is a virtual assistant system comprising an authentication device and a virtual assistant device, according to an embodiment.

FIG. 3 illustrates a process for authenticating a user accessing a virtual assistant system, according to an embodiment.

DETAILED DESCRIPTION

Figure 1A:
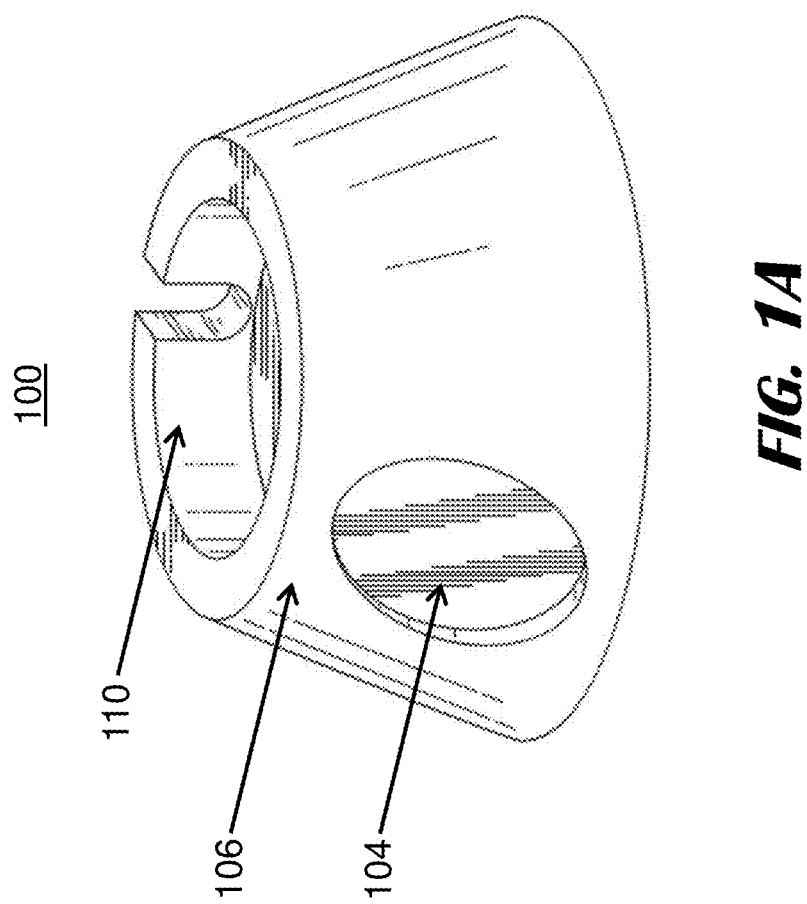
FIG. 1A illustrates an authentication device, according to an embodiment.
Figure 1B:
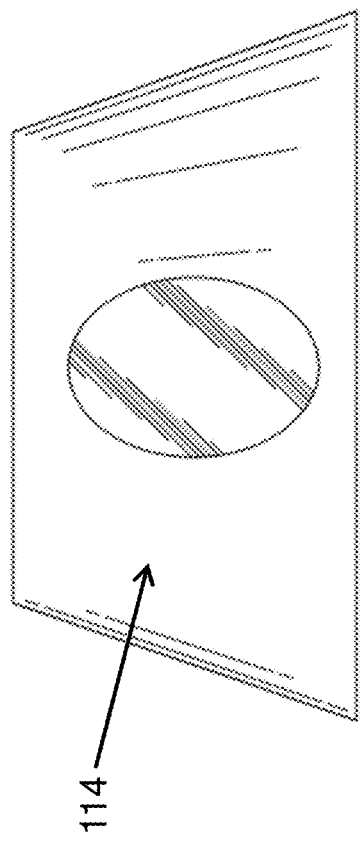
FIG. 1B is a front view of an authentication device, according to an embodiment.
Figure 1C:
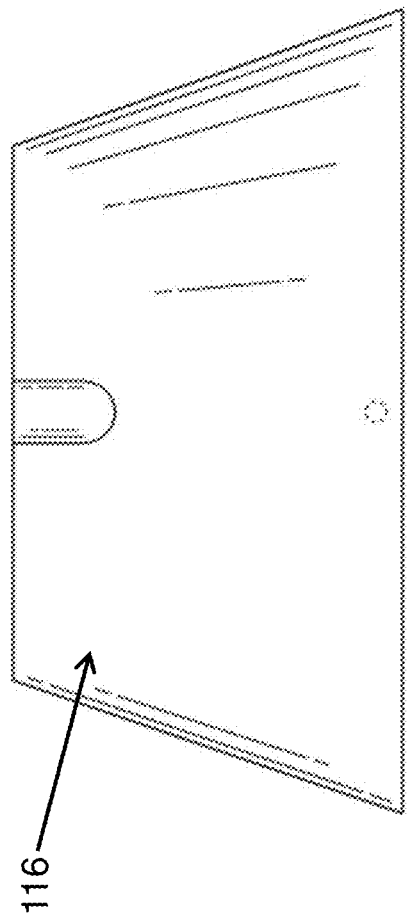
FIG. 1C is a rear view of an authentication device, according to an embodiment.
Figure 1D:
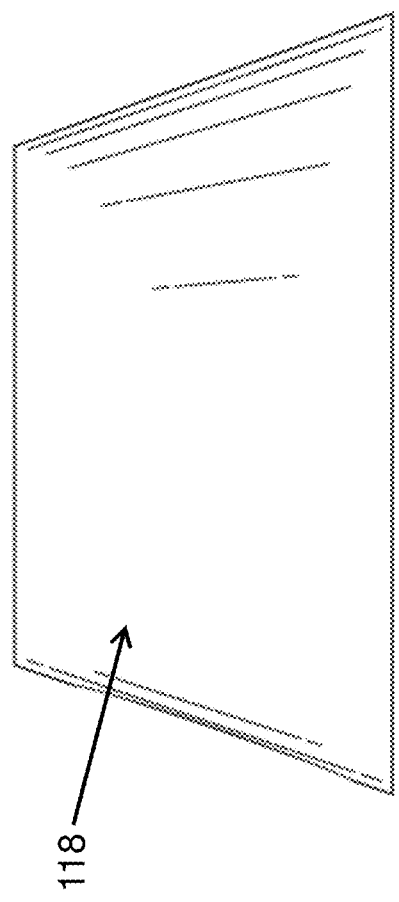
FIG. 1D is a right side view of an authentication device, according to an embodiment.
Figure 1E:
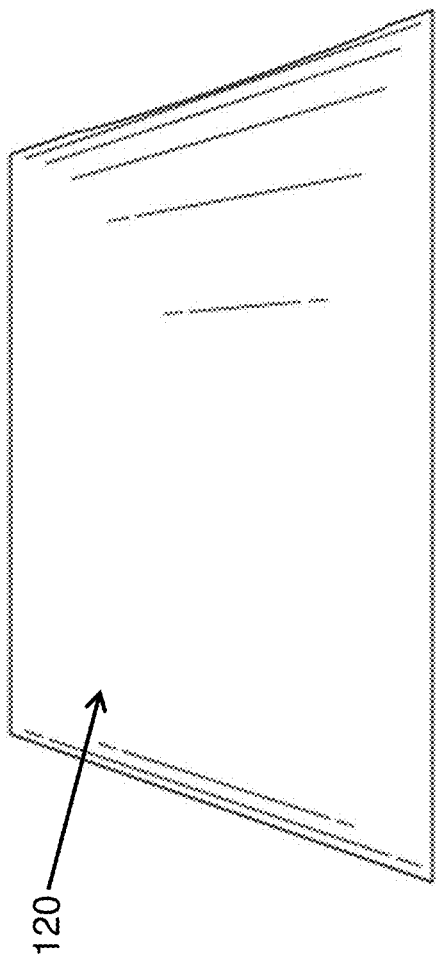
FIG. 1E is a left side view of an authentication device, according to an embodiment.
Figure 1F:
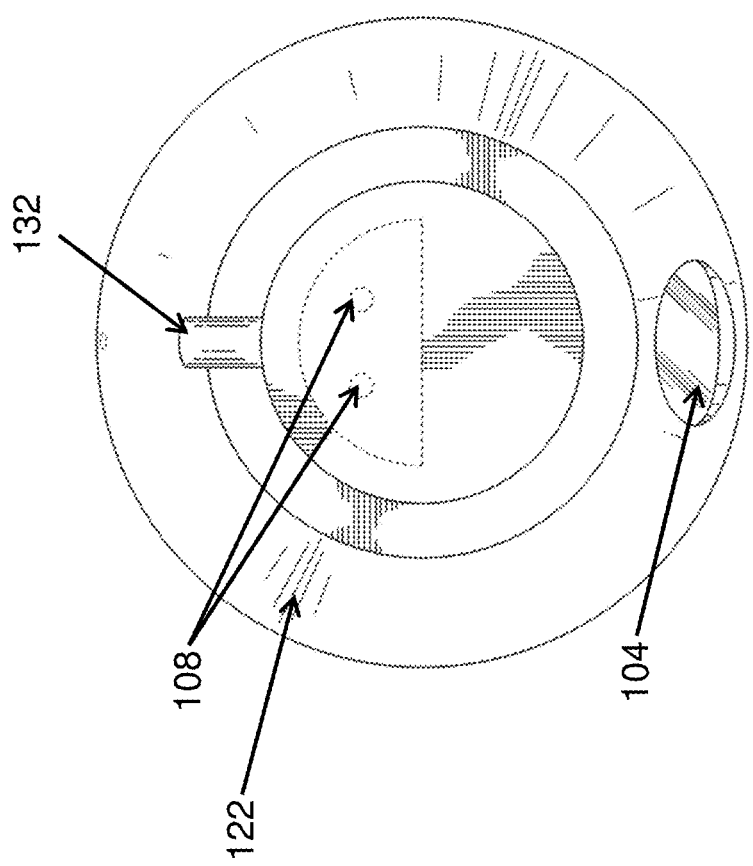
FIG. 1F is a top view of an authentication device, according to an embodiment.
Figure 1G:
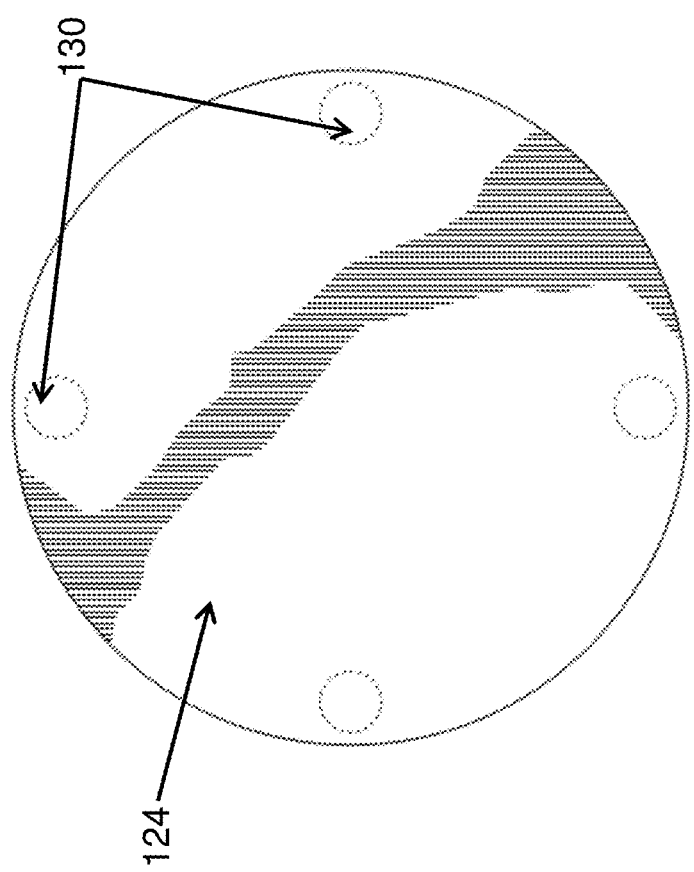
FIG. 1G is a bottom view of an authentication device, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1A-1J illustrates a virtual assistant system having an authentication device 100 and an electronic virtual assistant device 102 (hereinafter also referred to as an electronic device 102). The authentication device 100 and the electronic device 102 may be securely coupled to each other by coupling of various components of the authentication device 100 and the electronic device 102 to allow communication between various same or different components of the authentication device 100 and the electronic device 102. In some embodiments, the authentication device 100 and the electronic device 102 may be securely coupled to each other using wired means. In some embodiments, the authentication device 100 and the electronic device 102 may be securely coupled to each other using wireless technology. In some embodiments, the authentication device 100 and the electronic device 102 may be securely coupled to each other using one or more connectors.

An authentication device 100 of a virtual assistant system may include a biometric identification device (also referred to as a biometric identification reader). The biometric identification reader is configured to receive biometric data of a user. The authentication device 100 is configured to authenticate the user upon determining that a set of purported biometric data credentials received from the user in the biometric identification reader matches a set of credentials associated with the user stored in a database. In one non-limiting embodiment, a biometric identification device may correspond to a fingerprint recognition device such as a fingerprint reader 104. In the non-limiting embodiment, the fingerprint reader 104 is of oval shape. In alternate embodiments, the fingerprint reader 104 may be of any suitable geometric shape such as circular, rectangular, or the like without limiting the scope of the disclosed embodiments. The authentication device 100 may further include one or more electronic circuits, one or more processors, a memory, and a battery. The authentication device 100 may also be in communication with a database.

The authentication device 100 may have a housing 106 having an outer surface and an inner surface. The housing 106 may be a case, which is formed of plastic, glass, ceramics, fiber composites, stainless steel, aluminum, other suitable materials, or a combination of these materials. The housing 106 may be formed using a configuration in which some or all portion of the housing 106 is machined or molded as a single structure, or may be formed using multiple structures. In some configurations, the housing 106 may be formed using front and rear structures that are substantially planar. The front and rear structures of the housing 106 may correspond to walls such as a front wall 114 and a rear wall 116. The housing 106 may also have a top wall 122, a bottom wall 124 situated opposite the top wall 122, and multiple side and lateral walls such as right side wall 118 and left side wall 120 respectively, joined to and disposed between the top wall 122 and the bottom wall 124. The lateral walls such as right side wall 118 and left side wall 120 may be opposite one another and with the top wall 122 and bottom wall 124 define a side opening in the housing 106 for receiving a fingerprint reader 104. The top wall 122 may further contain an opening 110 formed through its thickness to allow access to at least a portion of a housing 112 of an electronic device 102, which is inserted into at least a portion of the housing 106 of the authentication device 100 through the opening 110 in the top wall 122. In some embodiments, at least a portion of the housing 106 of the authentication device 100 may be inserted and/or accommodated within at least a portion of the housing 112 of the electronic device 102. The bottom wall 124 may contain an opening formed through its thickness to allow access to one or more electronic circuits, one or more authentication servers comprising authentication processors, a memory, and a battery, which is inserted into the housing 106 through the opening in the bottom wall 124. The bottom wall 124 may also contain multiple rubber pads 130.

A housing 106 of an authentication device 100 may also include a depression and/or a recess containing a power charging adapter. In other words, the power charging adapter is disposed within the housing 106. The power charging adapter may include a charging body 128 having an elongated shape coupled to a power connector 126 (such as a power post) configured to receive corresponding connector port of the electronic device 102. The power connector 126 may also have an elongated shape. The length and width of the power connector 126 is smaller than length and width of the charging body 128. In some embodiments, the length and width of the power connector 126 may be larger than the length and width of the charging body 128. In some embodiments, the length and width of the power connector 126 may be substantially equal to the length and width of the charging body 128. The charging body 128 is coupled to the power connector 126 to securely establish an electrical connection and a mechanical connection between the authentication device 100 and the electronic device 102. In some embodiments, the power charging adapter may include multiple power connectors 126 configured to receive corresponding ports and/or sockets of the electronic device 102 to securely establish the electrical connection and the mechanical connection between the authentication device 100 and the electronic device 102. The charging body 128 portion of the power charging adapter may be disposed in the housing 106 and may include charging contacts 108 configured to receive power charge upon establishment of the power connection between the authentication device 100 and the electronic device 102. The charging contacts 108 may also enable passing through of power charge. The charge may power the authentication device 100. In some embodiments, the charge may power various servers and databases associated with and/or in communication with the authentication device 100. The charging contacts 108 may be spring loaded. In some embodiments, the charging contacts 108 may be magnetic. In some embodiments, the charging contacts 108 may be spring loaded and magnetic.

Figure 1I:
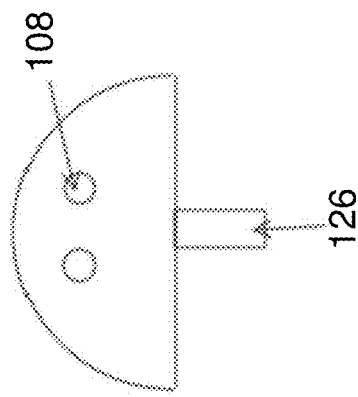
FIG. 1I is a bottom view of charging adapter of an authentication device, according to an embodiment.
Figure 1H:
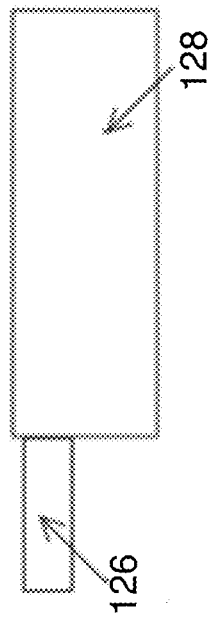
FIG. 1H is a side view of charging adapter of an authentication device, according to an embodiment.

One or more power connectors 126 may be formed through its thickness for receiving and mounting the power connectors 126 on the housing 106. In some embodiments, the power connectors 126 may be formed in the top wall 122 of the housing 106, and a data interface connector and a power connector of the power connectors 126 may be mounted on the top wall 122. In some embodiments, the power connectors 108 may be also formed in the bottom wall 124 of the housing 106, and the data interface connector and the power connector of the power connectors 126 may be mounted on the bottom wall 124. In some embodiments, the power connectors 126 may be formed in side walls such as right side wall 118 and left side wall 120 respectively of the housing 106, and the data interface connector and the power connector of the power connectors 126 may be mounted on the side walls such as right side wall 118 and left side wall 120. The power connectors 126 may be adapted to be electrically coupled to corresponding power connectors mounted on the electronic device 102. As illustrated in FIGS. 1H and 1I, a power charging adapter in a housing 106 may include one power connector 126, identified as, a male plug configured to receive a corresponding female socket of the electronic device 102 to securely form the electrical connection and/or the mechanical connection between the authentication device 100 and the electronic device 102. In some embodiments, the power connector 126, may be identified as, a female socket is configured to receive a corresponding male plug of the electronic device 102 to securely form the electrical connection and/or the mechanical connection between the authentication device 100 and the electronic device 102, which may be a stand-alone, stationary, non-battery powered, and WIFI-enabled electronic virtual assistant device, such as AMAZON™ ALEXA™.

The authentication device 100 optionally includes a notch 132 on a top surface of the housing 106. The notch is configured to receive a power cord, Ethernet cable, or other wiring from the electronic device 102 or charging body 128. The notch 132 can allow a more secure fitting of the electronic device 102 in the opening 110 by allowing any cord, cable, or wire to pass directly through a wall of the housing 106.

The housing 106 may also include a cover. The cover may be pivotally mounted on the housing 106, and is positioned on the housing 106 and dimensioned to cover the fingerprint reader 104. The cover may be pivotable to an open position to allow the fingerprint reader 104 to be inserted into and removed from the housing 106, and a closed position to enclose and secure the fingerprint reader 106 in the housing 104.

Figure 2:
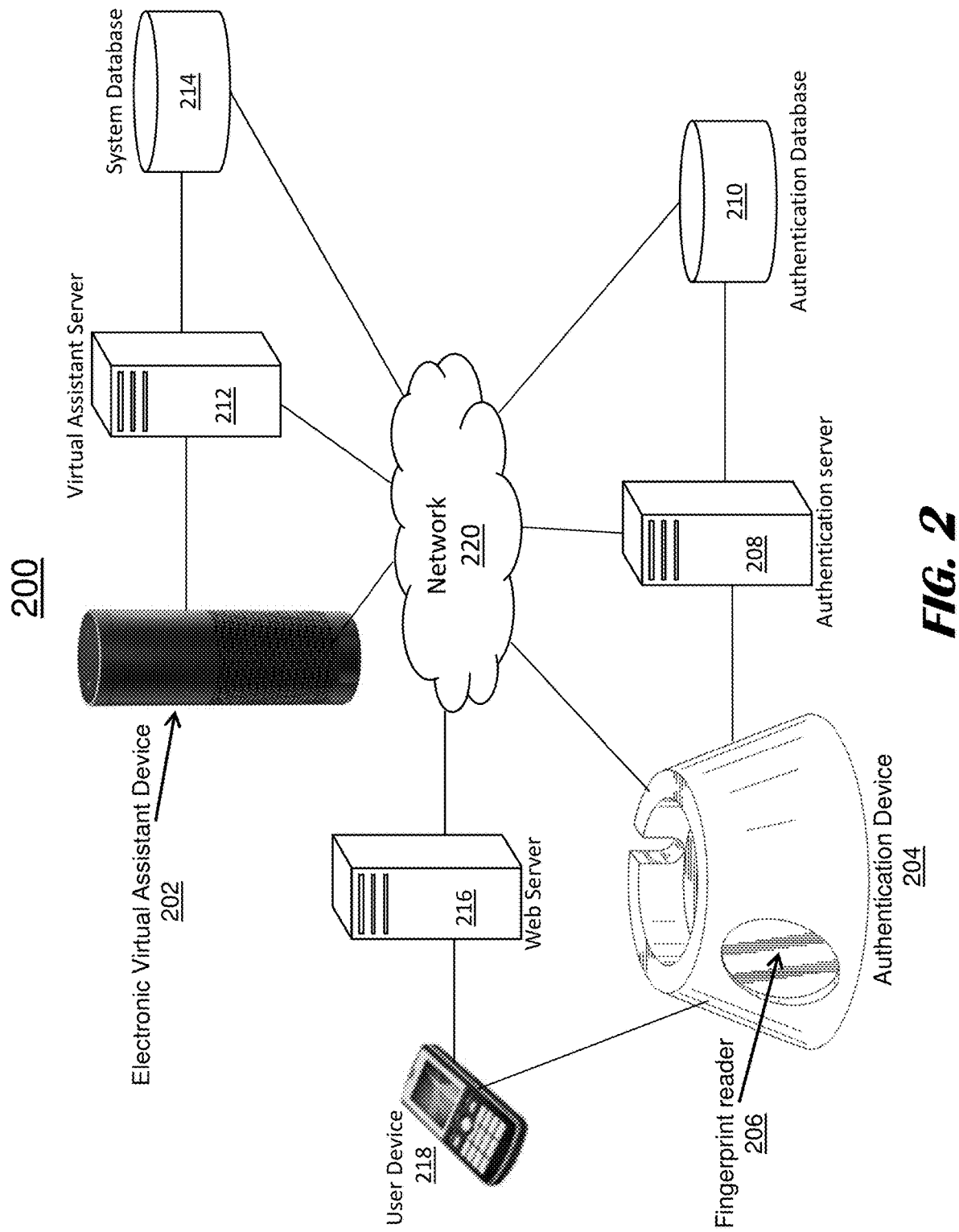
FIG. 2 illustrates a virtual assistant system for authenticating a user accessing a virtual assistant device, according to an embodiment.

FIG. 2 illustrates a virtual assistant system 200. The system 200 includes an electronic virtual assistant device 202 (hereinafter also referred to as an electronic device), an authentication device 204 having a fingerprint reader 206, an authentication server 208, an authentication database 210, a virtual assistant server 212 (hereinafter also referred to a system server), a system database 214, a webserver 216, and a user device 218. Various components of the virtual assistant system 200 such as the electronic device 202, the authentication device 204 having the fingerprint reader 206, the authentication server 208, the authentication database 210, the virtual assistant server 212, the system database 214, the webserver 216, and the user device 218 may communicate with each other via a network 220. The examples of the network 220 may include, but are not limited to, private or public LAN, WLAN, MAN, WAN, and the Internet. The network 220 may include both wired and wireless communications according to one or more standards and/or via one or more transport mediums. The communication over the network 220 may be performed in accordance with various communication protocols such as Transmission Control Protocol and Internet Protocol (TCP/IP), User Datagram Protocol (UDP), and IEEE communication protocols. In one example, the network 220 may include wireless communications according to Bluetooth specification sets, or another standard or proprietary wireless communication protocol. In another example, the network 220 may also include communications over a cellular network, including, e.g. a GSM (Global System for Mobile Communications), CDMA (Code Division Multiple Access), EDGE (Enhanced Data for Global Evolution) network.

An authentication device 204 having a fingerprint reader 206 may be coupled with an electronic device 202 to authenticate users prior to the users accessing various features of the electronic device 202. In some embodiments, the authentication device 204 having the fingerprint reader 206 may be wired or wirelessly connected with the electronic device 202 to authenticate the users prior to the users accessing various features of the electronic device 202. In one non-limiting example, the electronic device 202 may be wired or wirelessly connected to a fingerprint reader 206 of the authentication device 204 to authenticate the users using fingerprint data of the users. If a user does not present a fingerprint that matches the fingerprint of a registered user, the user will not be authorized to access the electronic device 202. The electronic device 202 may be a virtual assistant device, portable computer, a tablet computer, a computer monitor, a handheld device, global positioning system equipment, a gaming device, a cellular telephone, portable computing equipment, or other electronic equipment. In operation, the fingerprint reader 206 may operate in multiple modes to authenticate users. For example, the fingerprint reader 206 may operate in a stationary mode and a moving mode to authenticate the users. In the stationary mode, a fingerprint reader 206 may capture fingerprints while a user's finger is held in a stationary position on the fingerprint reader 206 and then transmit captured fingerprint data to a processor of an authentication server 208, which may authenticate the user based on the processing of the captured fingerprint data. In the moving mode, a fingerprint reader 206 may require that a user swipe a finger across the fingerprint reader 206 and then transmit captured fingerprint data to a processor of an authentication server 208, which may authenticate the user based on the processing of the captured fingerprint data. A fingerprint reader 206 may include a fingerprint sensor. In some embodiments, the fingerprint reader 206 may be associated and/or coupled to a fingerprint sensor, which may be a separate component. In some embodiments, the fingerprint reader 206 may be associated and/or coupled to multiple fingerprint sensors, which may be separate components. The fingerprint reader 206 may further include a receiving portion in any suitable shape that is configured to accept at least a percentage of one finger of a user. The at least one finger of a user may be disposed in proximity to the receiving portion and readable by the fingerprint sensor. Upon receipt of the percentage of the at least one finger of a user, the fingerprint sensor detects one or more predetermined features of the at least one finger of a user while reading at least a portion of a fingerprint of a user's finger in response to the finger positioned adjacent to the fingerprint sensor. In some embodiments, the fingerprint sensor may further include a feature detection sensor that is in operative relation with the fingerprint sensor. In some embodiments, the fingerprint sensor may further include multiple feature detection sensors that are in operative relation with a single fingerprint sensor. In some embodiments, the fingerprint sensor may further include multiple feature detection sensors that are in operative relation with multiple fingerprint sensors. The feature detection sensor detects the one or more predetermined features, or any combination thereof of the at least one finger of a user. The one or more predetermined features may correspond to any marks on the finger, a color of skin of the finger, etc.

A fingerprint sensor and/or a feature detection sensor may be physically associated with a fingerprint reader 206 of an authentication device 204 (e.g., connected to, or a component of). In some embodiments, the fingerprint sensor and/or the feature detection sensor may be part of the fingerprint reader 206 of the authentication device 204. The fingerprint sensor and/or a feature detection sensor may be configured to detect the one or more predetermined users and features of their fingers. The fingerprint sensor and/or the feature detection sensor may be configured to generate biometric data (such as fingerprint data), which may then be processed by one or more processors of an authentication server 208 of the authentication device 204 to determine various modes of operation. The authentication server 208 may be part of the authentication device 204. In some embodiments, the authentication server 208 may be a separate component in communication with the fingerprint reader 206 of the authentication device 204. In some embodiments, the authentication server 208 may be a separate component in communication with the fingerprint sensors and/or the feature detection sensors of the authentication device 204. As detailed herein, the fingerprint sensor and/or the feature detection sensor may transmit the biometric fingerprint data collected during the fingerprint sensor and/or the feature detection sensor operations to the one or more processors of the authentication server 208 of the authentication device 204 for subsequent processing by the one or more processors of the authentication server 208.

During operation, the one or more processors of the authentication server 208 of the authentication device 204 may match the received biometric fingerprint data with stored biometric data of authorized users in an authentication database 210. Additionally or alternatively, one or more sensor processors of the fingerprint sensor and/or the feature detection sensor may be connected to or housed within the fingerprint sensor and/or the feature detection sensor for subsequent processing of the biometric fingerprint data. During processing operation, the one or more sensor processors of the authentication server 208 of the authentication device 204 may match the biometric fingerprint data with stored biometric data of authorized users in an authentication database 210. The sensor processors of the fingerprint sensor and/or the feature detection sensor may include a microprocessor that executes various data processing routines, whereby the biometric fingerprint data received at the sensor processor of the fingerprint sensor and/or the feature detection sensor or processor of the authentication device 204 has been partially or completely pre-processed as useable data for authentication of the user. In some configurations, the fingerprint sensor and/or the feature detection sensor may be a part of (e.g., communicatively coupled with) the authentication device 204. For instance, the fingerprint sensor and/or the feature detection sensor may be an internal device installed and executing on the authentication device 204. In some embodiments, an electronic device 202, which may be a stand-alone, stationary, non-battery powered, WIFI-enabled computerized virtual assistant device connected to the authentication device 204 may identify a connection with the authentication device 204 and then activate the fingerprint reader 206 in order to receive instructions of authorization of the user determined based on the sensory data from the fingerprint sensor and/or the feature detection sensor of the fingerprint reader 204.

The authentication device 204 may further include a communications component. The communications component may effectuate wired and/or wireless communications to and from transmitters and/or receivers of an electronic device 202, which may be a stand-alone, stationary, non-battery powered, WIFI-enabled computerized virtual assistant device. The communications component may also effectuate wired and/or wireless communications to and from one or more processors of an authentication server 208. In some embodiments, the communications component may be an embedded component of the authentication device 204; and, in some cases, the communications component may be attached to the authentication device 204 through any wired or wireless communications medium. In some embodiments, the communications component may be shared among a plurality of sensor processors of a fingerprint sensor and/or a feature detection sensor of the authentication device 204, such that each of the sensor processor of the fingerprint sensor and/or the feature detection sensor coupled to the communications component may use the sensor data and/or authentication data received within a communications signal, by the communications component.

A communications component of the authentication device 204 may include electromechanical components (e.g., processor) that allow the communications component to communicate various types of biometric sensor data (fingerprint data of a user) captured by fingerprint reader 204 with sensor processors, processors of an authentication server 208, and/or transmitters and receivers of an electronic device 102, which may be a stand-alone, stationary, non-battery powered, and WIFI enabled virtual assistant device via communications signals. In some implementations, these communications signals may represent a distinct channel for hosting communications, independent from the sensor communication. The biometric sensor data may be communicated using the communications signals, based on predetermined wired or wireless protocols and associated hardware and software technology. The communications component may operate based on any number of communication protocols, such as Bluetooth®, Wireless Fidelity (Wi-Fi), Near-Field Communications (NFC), ZigBee, and others. However, it should be appreciated that the communications component is not limited to radio-frequency based technologies, but may include radar or infrared.

Using a communications signal, a communications component of an authentication device 100 may communicate biometric sensor data (fingerprint data of a user) captured by fingerprint reader 204 that may be used, e.g., to identify authorized users of an electronic device 102, which may be a stand-alone, stationary, non-battery powered, and WIFI enabled virtual assistant device, and determine whether authorized users are approved to generate requests to access sensitive data, among other possible functions. Similarly, a communications component of an electronic device 202 may use a communications signal to communicate data to the authentication device 204. As an example, the communications component of the authentication device 204 may communicate (i.e., send and receive) different types of biometric sensor data (e.g., fingerprint based authentication data and user identification data) containing various types of information. Non-limiting examples of the information may include a user identifier (user ID) of a user, and other such information.

A fingerprint reader 206 may further include a plug-in interface to communicate fingerprint data associated with the a fingerprint of at least one of user's finger and feature information associated with the user to an authentication server 208. The authentication server 208 may execute a fingerprint-analyzing program/algorithm for authenticating the user by verifying the fingerprint of the user's finger by matching with the fingerprint of the user's finger with a set of fingerprint credentials associated with authorized users stored in an authentication database 210. Additionally, the authentication server 208 may include the feature-analyzing program/algorithm for detecting one or more predetermined features, or any combination thereof of the user. The one or more predetermined features may correspond to any marks on the finger, a color of skin of the finger, etc.

Authentication server 208 may be devices where fingerprint-analyzing program/algorithm and/or feature-analyzing program/algorithm may be executed for verifying fingerprints and/or features of a user received from a fingerprint reader 104. The authentication server 208 may be any server computing device comprising a processor and capable of performing the various tasks and processes described herein. Non-limiting examples of the analytic server may include laptops, desktops, servers, tablets, and smartphones. The authentication server 208 may be coupled via one or more internal or external networks to a database. Software such as fingerprint-analyzing program/algorithm and/or feature-analyzing program/algorithm executed by the analytic server permits the analytic server to validate the fingerprint of the user and authenticate the user. The authentication server 208 may then transmits authentication status and/or corresponding authentication data of the user to a virtual assistant server 212 associated with an electronic device 202 to allow the electronic device 202 to accept and process one or more requests from the user based on the authentication status. In some embodiments, the authentication server 208 may transmit the authentication status and/or corresponding authentication data of the user directly to a processor of the electronic device 202 to allow the electronic device 202 to accept and process one or more requests from the user based on the authentication status.

When an authentication server 208 determines that a fingerprint of a user received from a fingerprint reader 206 does not match a record of fingerprints of authorized users stored in an authentication database 210, then the authentication server 208 may activate an alarm device. The alarm device may produce a warning, and/or may generate and transmit a digital message and/or a voice message to an user device 218 operated by an authorized user (who may be an administrator and/or owner of electronic device 202). In one non-limiting example, after the authentication server 208 determines that the fingerprint of the user received from the fingerprint reader 206 does not match a record of fingerprints of authorized users stored in the authentication database 210, the authentication server 208 may generate and transmit a trigger signal to a processor of the alarm device, which may activate the warning, and/or generate and transmit a notification about unauthorized attempt to access the electronic device 102 to the user device 218. A warning produced by the alarm device may include any type of sensory feedback, such as audio feedback, visual feedback, haptic feedback, or some combination. In another non-limiting example, after the authentication server 208 determines that the fingerprint of the user received from the fingerprint reader 206 does not match a record of fingerprints of authorized users stored in the authentication database 210, the authentication server 208 may generate and transmit a trigger signal to a processor of a camera device comprising one or more cameras located in a building where the electronic device 202 is located in order to capture images of the unauthorized user whose fingerprints did not match a record of fingerprints of authorized users. The authentication server 208 may then transmit a notification about unauthorized attempt to access the electronic device 202 and images captured to the user device 218.

In some embodiments, when an authentication server 208 determines that a fingerprint of a user received from a fingerprint reader 206 does not match a record of fingerprints of authorized users stored in an authentication database 210, then the authentication server 208 may select a record of an authorized user (who may be an administrator and/or an owner of electronic device 202) from the authentication database 210, and then review or update unauthorized attempt data stored in the user record to mention that an unauthorized attempt to access the electronic device 202 occurred.

In some embodiments, when an authentication server 208 determines that a fingerprint of a user received from a fingerprint reader 206 does not match a record of fingerprints of authorized users stored in an authentication database 210, then the authentication server 208 may generate an alert. After generating the alert, the authentication server 208 may score the alert. The authentication server 208 may score the alert based on one or more attributes. For instance, when the authentication server 208 determines that only a single fingerprint is received from a fingerprint reader 206 within a predetermined amount of time that does not match a record of fingerprints of authorized users stored in the authentication database 210, then the authentication server 208 may assign a low risk score to alert. However, when the authentication server 208 determines that multiple fingerprints have been received from a fingerprint reader 104 within a predetermined amount of time, and none of the received fingerprints match a record of fingerprints of authorized users stored in the authentication database 210, then the authentication server 208 may assign a high risk score to the alert. Based on a risk score calculated for alerts, the authentication server 208 may transmit an alert record to address next to an analyst computer operated by an analyst. The risk score can prioritize the queue for the analyst computer, and can continuously update the risk score, and thus the prioritization, within the queue. Based on the risk score of the alert, the analyst computer may select a mode of communication to connect with user device 218 of an authorized user (who may be an administrator and/or an owner of electronic device 202).

An analyst computer (not shown) GUI operated by an analyst may receive alerts associated with fraudulent fingerprint attempts by unauthorized users from an authentication server 208. In some embodiments, the analyst computer GUI operated by the analyst may directly receive alerts associated with the fraudulent fingerprint attempts by the unauthorized users from a fingerprint reader 206. In some embodiments, the analyst computer GUI operated by the analyst may directly receive alerts associated with the fraudulent fingerprint attempts by the unauthorized users from an authentication device 204. In some embodiments, the analyst computer GUI may receive alerts that are related to subject matter (e.g., type of threat) or procedural role (e.g., time-sensitive threat) of the respective analyst. In some implementations, the alerts may have a data field indicating identifying the nature of the potential threat and another data field indicating a time-sensitive nature or customer-sensitive nature of the potential threat. Based on this data field, the analyst computer may receive the alerts having subject matter or procedural data fields associated with the analyst credentials. For instance, the analyst credentials of an analyst specializing in time sensitive alerts would indicate to the analyst computer that the analyst computer should retrieve and present the alerts having a data field indicating that the particular alert is time sensitive. In some implementations, the alerts may be stored into dedicated databases or sub-databases of a system database 214 or an authentication database 210, where each sub-database is configured to store alerts with certain types of alerts. In such implementations, the analyst computer may be limited to accessing certain sub-databases according to the analyst credentials of the analyst operating the analyst computer. Similarly, the analyst computer may receive updates or notification messages that the analyst computer presents on a GUI to the analyst. An analytic computer, system database 214, or other server may trigger and transmit alert notification to each analyst computer having analyst credentials with access attributes indicating the role of the analyst. For instance, an analyst may have analyst credentials with attributes that indicate the analyst specializes in handling time-sensitive alerts. When a new alert is generated or an existing alert is updated with a data field indicating the alert is time sensitive, the analytic computer or other device may transmit a notification message to the analyst computer.

An analyst computer may have a GUI that allows an analyst to mark or tag an alert corresponding to unauthorized attempt to access an electronic device 202 by unauthorized users. A data field in the record of the alert is then updated to reflect the tag inputted by the analyst computer. The analyst computer may further perform various forms of processing on the data fields, such as identifying which, if any, other alerts contain maximum risk. In some embodiments, the analyst computer may perform various forms of processing on the data fields to validate the alert corresponding to the fraudulent fingerprint attempt. The analyst computer upon processing and analyzing the alert may transmit a notification to a user device 218 (such as a mobile phone) of a user indicating that a fraudulent fingerprint attempt have been made to access features of the electronic device 202, which may be a stand-alone, stationary, non-battery powered, WIFI-enabled virtual assistant device. The notification may be transmitted to the user device 218 in form of a telephone call, a message, or an electronic email. The notification may include a date and a time at which fraudulent fingerprint attempt occurred. The notification may also include a number of times the fraudulent fingerprint attempts occurred. The notification may also include images captured at location of the authentication device 204 and/or the electronic device 202.

During the processing of an alert, an analyst computer may also check validity of the alert by confirming that the received fingerprint does not match a record of approved fingerprints stored in an authentication database 210. For instance, the analyst computer may query an authentication database 210. The authentication database 210 may include a whitelist record and a blacklist record. In some embodiments, an analytic server may generate whitelist records and blacklist records based on classification of an incoming query associated with a received fingerprint, and store in the authentication database 210. In some embodiments, an analyst computer may generate whitelist records and blacklist records based on classification of an incoming query associated with a received fingerprint, and store in the authentication database 210. The query is classified based on a fingerprint, which may be performed in numerous ways. For example, one or more fingerprints associated with known registered client/customer of an electronic device 202 can be whitelisted (e.g., identified in the whitelist record). The query can be classified by consulting a record of previous classifications made to queries with the same fingerprint. The whitelist record may include a list of authorized fingerprints, and the blacklist record may include a list of un-authorized fingerprints. The set of one or more acceptable and authorized fingerprint of the whitelist record are predetermined to satisfy the safety acceptability threshold. During operation, in order to verify that a fingerprint received from one or more users matches with a stored record of a fingerprints, the analyst computer may first query the whitelist record hosted by the authentication database 210. Upon determining that the received fingerprint is present in the whitelist, the analyst computer may automatically forge determination of creditability of the fingerprint that is matched to an satisfactory fingerprint in the whitelist record.

User device 218 may be a computing device used by a user who may have authorization to access an electronic device 202, which may be a stand-alone, stationary, non-battery powered, WIFI-enabled virtual assistant device. In some embodiments, the user may be owner of an electronic device 202 and be allowed to authorize one or more other users who may have access to various features of the electronic device 202. The user device 218 may be any computing device comprising a processor and non-transitory machine-readable storage medium and capable of performing the various tasks and processes described herein during execution. Non-limiting examples of the user device 218 may include a mobile device, a desktop computer, a server computer, a laptop computer, a tablet computer, and the like. For ease of explanation, it is assumed that a single mobile device functioning as the user device 218. However, it should be appreciated that some embodiments may comprise any number of mobile devices capable of performing the various tasks described herein.

An electronic virtual assistant device 202 may be a computerized voice assistant device and/or a voice controlled assistant. The electronic device 202 is described in context of an architecture in which the electronic device 202 is connected to remote people or cloud service via a network 220 (e.g., connected via WIFI to the internet or private network). The electronic device 202 may be implemented as a hands-free device equipped with a wireless interface, and may rely on voice interactions with a user for receiving requests. In some embodiments, the electronic device 202 may be a stand-alone voice controlled assistant, that is, the electronic device 202 may only be in communication with various voice-based services implemented via virtual assistant programs and applications. In some embodiments, the electronic device 202 may be a stationary voice controlled assistant, which is that the electronic device 202 is designed for regular use at a single location on or near a desk or table due to size and power requirements. In some embodiments, the electronic device 202 may be a non-battery powered, WIFI-enabled voice controlled assistant, whereby the device is positioned on a surface (e.g., shelf, table, dashboard, desk, nightstand) and plugged into a power source. Such configuration may be considered "stationary" in that it is configured to stay in a single location and listen and communication over a network from that location. The authentication device 204 serves as a base for the device and is intended to be positioned on a surface where it can have a consistent power source and network connection. In some embodiments, the electronic device 202 may be a stand-alone, stationary, non-battery powered, and WIFI enabled computerized voice controlled assistant.

In some embodiments, the electronic device 202 may be any computing device comprising a processor and non-transitory machine-readable storage medium and capable of performing the various tasks and processes described herein during execution. The electronic devices 202 may also include a desktop computer and a server computer comprising virtual assistants. In some embodiments, the electronic device 202 may be part of a virtual assistant system, which also includes a virtual assistant server 212 and a system database 214. To illustrate one non-limiting example usage scenario of the electronic device 202, the electronic device 202 may be stationary and positioned in a room to receive user input in the form of voice interactions, such as spoken requests or a conversational dialogue. Depending on the request, the electronic device 202 may perform any number of actions or functions. For instance, the electronic device 202 may initiate a financial transaction requested by the user. For example, the user employs the electronic device 202 to engage in an online banking transaction.

An electronic device 202 may be configured to communicate with an authentication device 204 through one or more networks 220, using wired and/or wireless communication capabilities. In some embodiments, a communications component of the electronic device 202 may be configured to communicate with a communications component of the authentication device 204 through one or more networks 220, using wired and/or wireless communication capabilities. In some embodiments, the electronic device 102 may also be configured to communicate with an authentication server 208 through one or more networks 220, using wired and/or wireless communication capabilities. In some embodiments, the electronic device 102 may also be configured to communicate with the authentication device 204 via the authentication server 208 through one or more networks 220, using wired and/or wireless communication capabilities. In some embodiments, the electronic device 102 may also be configured to communicate with the authentication device 204 via an analyst computer through one or more networks 220, using wired and/or wireless communication capabilities.

In operation, an electronic device 202 and ECHO™ may execute a virtual assistant program, which may include a user interface that renders an interactive layout, schematic, or other elements for an authorized user to input a request via a webserver 216. For example, the user interface may include a text based interface allowing the authorized user to enter manual commands. The request inputted by the authorized user corresponds to an instruction, which is sent by the electronic device 102 to a virtual assistant server 212 through a network 220. In some embodiments, the instruction may correspond to the request inputted by the authorized user interacting with a chatbot. A chatbot may also be known as a talkbot, chatterbot, Bot, chatterbox, Artificial Conversational Entity. The chatbot may be a computer program that conducts a conversation with the authorized user via auditory or textual methods on a user interface. The computer program is designed to simulate how the authorized would behave as a conversational partner. The chatbots may be used in dialog systems for various purposes including customer service or information acquisition. In some embodiments, some of the chatbots may use natural language processing systems, which may scan for keywords within the input request, then pull a reply with the most matching keywords, or the most similar wording pattern, from a database to answer the request of the authorized user.

An electronic device 202 may receive multiple instructions/requests from a same user or different users. Each user who can transmit the instruction to the electronic device 202 must be authorized by an authentication device 204 prior to the electronic device 202 receiving the multiple instructions/requests from a same user or different users. The instructions/requests may be of same subject matter or different subject matters. In some embodiments, the electronic device 202 may execute a virtual assistant program to allow the user to input a request or display the requested information to the user. The user may input a request of different types or formats. For example, the request may be in the type of rich text or auditory input (e.g., WAV, MP3, WMA, AU, and the like), or any other format the electronic device 202 supports. The user may choose to input a request in one type or any combination of different types based on his/her preference. For example, the user may input a request that includes texts of different fonts, pictures of different types (e.g. BMP, GIF, JPG or PNG). The word processing software may support rich text file format and makes it a common format between otherwise incompatible word processing software and operating systems. There may be subtle differences between different versions of the rich text format specification. Nevertheless, the rich text format is consistent enough from computer to computer to be considered highly portable and acceptable for cross-platform use.

In operation, a user after being authorized by an authentication device 204 may open a website in an Internet browser or a local application on an electronic device 102 configured to receive an instruction or a request from the user. The Internet browser or a local application on the electronic device 102 may be accessed via a webserver 216. In some embodiments, a secondary level of authentication may then be performed. For instance, the user may enter credential information such as username, password, certificate, and biometrics. The electronic device 202 then transmits the user inputs to a virtual assistant server 212 for authentication. The virtual assistant server 212 may access a system database 214 configured to store user credentials, which the virtual assistant server 212 may be configured to reference in order to determine whether a set of entered credentials (purportedly for secondarily authentication of the user) match an appropriate set of credentials that identify and authenticate the user. After the virtual assistant server 212 secondarily authenticates the user and/or determines the user's role, the virtual assistant server 212 may generate and serve webpages to the electronic device 202. The webpages may include the virtual assistant program user interface for the user to input requests/instructions. In a conversational client layer, the virtual assistant server 212 may receive different requests/instructions from the user through the electronic device 202. Different electronic devices 202 may have different input/output capabilities along with various ways of implementing solutions. Some electronic devices 202 may have audio input and output, while other electronic devices 202 may accept and reply with text, audio, rich media content and/or some combination thereof. For example, the user interface may include a text-based interface where the user can manually type requests and interact with a virtual assistant by using a keyboard. In another example, the user interface may include an audio-based interface where the user can issue requests/instructions by talking to a virtual assistant.

An electronic device 202 may transform requests/instructions of an authorized user into appropriate type for processing. In some embodiments, the electronic device 202 may transmit the requests/instructions of the authorized user to a virtual assistant server 212 for processing and analysis. In a transformation layer, the electronic device 202 may translate the communication protocols from various clients into a single set of application programming interfaces (APIs) for processing. While the requests/instructions received from the authorized user may be of different types, and then the electronic device 202 may not be able to understand or process all different types of the requests/instructions. In such cases, the electronic device 202 may then transform the requests/instructions to a specific computer readable type (e.g., PDF, DOC, DOCX, XLS, and the like). For example, the electronic device 202 supports audio, and the requests/instructions inputted by the user is audio, however the electronic device 202 may only understand text. In such cases, the electronic device 202 may transform the audio to text for further processing. In a standardized API layer, the electronic device 202 may translate the requests/instructions to a standard form, including audio translation, emoji translation, language translation, and image translation. The audio translation may convert the audio input (e.g., audio file or stream) of speech to text. The emoji translation may convert any emojis in the input into the lexical representation. The electronic device 202 may further pass along the translated emojis in a separate object for further intent and sentiment interpretation to an analytic server. The language translation may translate many languages to one or one language to many, depending on the user's requirements. The image translation may convert any images in the input into the lexical representation. After converting the requests/instructions of the user into a correct format, the electronic device 202 may then generate an answer in response to the requests/instructions. The electronic device 202 may generate the response in a format that the electronic device 202 supports. In some embodiments, after converting the requests/instructions of the user into the correct format, the electronic device 202 may then perform a transaction such as transferring money from one account to other account in response to the request/instruction received from the authorized user.

An electronic device 202 may be associated with a webserver 216, which may be any computing device hosting an Internet browser or a local application accessible to electronic device 202 via the Internet. The webserver 216 may be any computing device comprising a processor and non-transitory machine-readable storage capable of executing the various tasks and processes described herein. Non-limiting examples of such webserver 216 may include workstation computers, laptop computers, server computers, laptop computers, and the like.

The webserver 216 may execute software applications configured to host a local application (e.g., Apache®, Microsoft IIS®), which may generate and serve virtual assistant page to the electronic device 202. The virtual assistant page may be used to generate requests by an authorized user to access data (such as sensitive financial data and personal information) stored on a system database. In some implementations, the webserver 216 may be configured to require user secondarily authentication based upon a set of user authorization credentials (e.g., biometric data, biometrics, cryptographic certificate). In such implementations, the webserver 216 may access a system database 214 configured to store user credentials, which the webserver 216 may be configured to reference in order to determine whether a set of entered credentials purportedly authenticating the user match an appropriate set of credentials that identify and authenticate the user. Similarly, in some implementations, the webserver 216 may generate and serve virtual assistant page to the electronic device 202 based upon a user role. In such implementations, the user role may be defined by data fields in the user records stored in the system database 214, and secondarily authentication of the user and user role may be conducted by the webserver 216 by executing an access directory protocol. The webserver 216 may then be instructed to generate virtual assistant page content, access or generate data stored in the system database 214, according to the user role defined by the user record in the system database 214.

In some embodiments, as the webserver 216 may require users to secondarily authenticate using credentials that identify a user as a valid customer, the webserver 216 may generate alerts related to user's interactions with the virtual assistant page hosted by the webserver 216. For example, the webserver 216 may generate the alerts indicating a failed authentication attempt received from an electronic device 202. As another example, the webserver 216 may generate the alerts when the user performs or otherwise requests unusual actions. In some cases, the webserver 216 may generate a model for typical or atypical behaviors of the user. The model, for example, may indicate a list of general requests of a user. It should be appreciated that these are only examples of the alerts that may be generated by the webserver 216, and the webserver 216 may generate the alerts for any number of interactions with the website.

A webserver 216 may generate session records for an interaction between a virtual assistant program of an electronic device 202 and a user. A session record may contain data fields related to the interaction, such as a session identifier, a timestamp, and a user identifier. The webserver 216 may store the session records locally or in a system database 214 hosted on any virtual assistant server 212 within a network 220. The webserver 216 may capture data for the interaction at different times of the interactions, such as capturing user biometric identifier information from an authentication attempt. In some instances, a session may transition between channels. For example, a session may begin when a user accesses the electronic device 202 and is properly authenticated as an authorized customer. The user may then experience difficulties in accessing certain features or may identify certain irregularities in the electronic device 202, prompting the user to contact an admin over a telephone. The session information for that additional contact may continue as the session transitions from a virtual assistant-based channel to a telephone-based channel. The admin may input various information fields into a GUI presented on a admin computer, such as the purported user who is contacting the admin and source device information.

An authentication database 210 may be hosted on an authentication device 204 and/or an electronic device 202, where the authentication database 210 may store data records associated with various aspects of the application services offered to end users. Non-limiting examples of what may be stored in the authentication database 210 may include user records that may comprise data fields describing users, e.g., user data, such as authorized user credentials (e.g., biometrics, encryption certificates, username, passwords), white lists, black lists, user roles, or user permissions; document records that may comprise machine-readable computer files (e.g., word processing files), parsed portions of such computer files, or metadata associated with computer files; and application data that may include software instructions executed by an analytic server or data used by the such applications executed by the analytic server.

A memory of an authentication database 210 hosted on an authentication device 204 and/or an electronic device 202 may be a non-volatile storage device for storing user credentials such as biometrics, encryption certificates, username, passwords, to be used by a processor of the authentication device 204 and/or the electronic device 202. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

A memory of an authentication database 210 hosted on an authentication device 204 and/or an electronic device 202 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

FIG. 3 illustrates a process for authenticating a user accessing a virtual assistant system, according to an method 300. The method 300 shown in FIG. 3 comprises execution steps 302, 304, and 306. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of FIG. 3 is described as being executed by a single server, referred to as an analytic server in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the authentication server described herein.

In a first step 202, an authentication server is configured to receive an authentication request for a user from a biometric identification reader of an authentication device. The authentication request for the user may correspond to access and/or execute a command using to an electronic virtual assistant device. The authentication request may include a set of purported biometric data credentials of the user. The set of purported biometric data credentials of the user may include fingerprint data of the user.

An authentication device may include a biometric identification device. The biometric identification reader is configured to receive a set of purported biometric data credentials of a user. The biometric identification device is a fingerprint recognition device such as a fingerprint reader. The fingerprint reader may include one or more fingerprint sensors. The fingerprint reader may be coupled to the one or more fingerprint sensors. The authentication device may further include one or more electronic circuits, one or more processors, a memory, and a battery. The authentication device may also be associated to a database. The fingerprint reader may be wired or wirelessly connected with an electronic virtual assistant device.

An electronic virtual assistant device may be a virtual assistant device, portable computer, a tablet computer, a computer monitor, a handheld device, global positioning system equipment, a gaming device, a cellular telephone, portable computing equipment, or other electronic equipment. In some embodiments, the electronic virtual assistant device may be a computerized virtual assistant device. The electronic virtual assistant device may include an application program interface. The application program interface is compatible with the authentication device programmed into comparing the set of purported biometric data credentials of the user to the set of credentials associated with authorized users In a next step 204, an authentication server is configured to query a database. The databases may be in communication with the authentication server. The database may store a set of biometric credentials associated with authorized users. The set of biometric credentials associated with authorized users corresponds to fingerprint data of the authorized users.

In a next step 206, an authentication server is configured to match the set of purported biometric data credentials of the user with the set of credentials associated with authorized users. In response to server matching the set of purported biometric data credentials of the user with the set of credentials associated with authorized users, the authentication server grants access to the user to a virtual assistant program/application being executed on the electronic virtual assistant device. The user may then generate and transmit one or more instructions/requests using the virtual assistant program/application being executed on the electronic virtual assistant device. The request may include performing a money transfer from one account to another account. The virtual assistant program/application may then transmit the instructions/requests to the authentication server. In some embodiments, the virtual assistant program/application may transmit the instructions/requests to the analytic server along with account information associated with the accounts of the user. The virtual assistant program/application may have access to all user data stored in a database or a cloud database. The authentication server may then execute the instructions/requests and performing the money transfer from one account to another account. Upon the authentication server performing the money transfer from one account to another account, the analytic server may then transmit a confirmation message corresponding to successful execution of the request to the virtual assistant program/application. The virtual assistant program/application may then transmit the same confirmation message to the user or modify the confirmation message and then transmit the modified conformation message to the user.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An authentication device comprising:
a housing comprising a top wall, a bottom wall positioned opposite to the top wall, and a lateral wall joined to and disposed between the top wall and the bottom wall and extending around the housing;
a recess on the top wall configured to receive at least a portion of an electronic virtual assistant device; and
a fingerprint reader disposed on the lateral wall and configured to receive a set of purported fingerprint data credentials of a user of the electronic virtual assistant device for authenticating the user.

2. The authentication device according to claim 1, wherein the housing has a frustoconical shape.

3. The authentication device according to claim 1, wherein the recess is configured to receive a housing of the electronic virtual assistant device to support the electronic virtual assistant device and the authentication device.

4. The authentication device according to claim 1, wherein the fingerprint reader comprises one or more fingerprint sensors.

5. The authentication device according to claim 1, wherein the fingerprint reader is configured to communicate over a network with an authentication server and an authentication database.

6. The authentication device according to claim 5, wherein the authentication database is configured to store a set of fingerprint credentials associated with authorized users of the electronic virtual assistant device.

7. The authentication device according to claim 5, wherein the fingerprint reader is configured to communicate the set of purported fingerprint data credentials of the user to the authentication server.

8. The authentication device according to claim 7, wherein the authentication server transmits authentication status of the user to the electronic virtual assistant device based on processing of the purported fingerprint data credentials of the user.

9. The authentication device according to claim 1, wherein the housing comprises a power charging adapter, the power charging adapter comprises a charging body coupled to a power connector, and the power connector is configured to be coupled to the electronic virtual assistant device.

10. An authentication device comprising:
a housing comprising a top wall, a bottom wall positioned opposite to the top wall, and a lateral wall joined to and disposed between the top wall and the bottom wall;
a recess on the top wall and that is configured to receive at least a portion of an electronic virtual assistant device;
a fingerprint reader disposed on the lateral wall and that is configured to receive a set of purported fingerprint data credentials of a user of the electronic virtual assistant device for authenticating the user; and
a power charging adapter disposed within the housing, the power charging adapter comprising a charging body coupled to a power connector having an elongated shape, the power connector is configured to couple to a socket of the electronic virtual assistant device, and the charging body comprising at least one charging contact enabling passing through of power charge from the housing to the charging body.

11. The authentication device according to claim 10, wherein the housing has a frustoconical shape.

12. The authentication device according to claim 10, wherein the fingerprint reader comprises one or more fingerprint sensors.

13. The authentication device according to claim 10, wherein the fingerprint reader is in communication with an authentication server and an authentication database, and wherein the authentication database stores a set of fingerprint credentials associated with authorized users of the electronic virtual assistant device.

14. The authentication device according to claim 13, wherein the fingerprint reader comprises a plug-in interface to communicate the set of purported fingerprint data credentials of the user to the authentication server.

15. The authentication device according to claim 14, wherein the authentication server transmits authentication status of the user to the electronic virtual assistant device based on processing of the purported fingerprint data credentials of the user.

16. The authentication device according to claim 10, wherein the electronic virtual assistant device is a computerized voice assistant device, and wherein the computerized voice assistant device comprises a virtual assistant program.

* * * * *